Sept. 27, 1938.  R. C. KASTER  2,131,326

DUMP TRAILER

Filed June 28, 1937

INVENTOR
Raymond C. Kaster
BY
ATTORNEYS

Patented Sept. 27, 1938

2,131,326

UNITED STATES PATENT OFFICE 2,131,326

DUMP TRAILER

Raymond C. Kaster, Olathe, Kans., assignor of one-fourth to Leo J. Pearce, Olathe, Kans., and one-fourth to A. E. West, Merriam, Kans.

Application June 28, 1937, Serial No. 150,713

3 Claims. (Cl. 298—5)

This invention relates to dump trailers of the character particularly adaptable for attachment to tractors or any other suitable means of pulling the trainer along, and the primary object is to provide in such a vehicle, means for moving the body thereof to dumping position merely upon backing the tractor to which the trailer is attached, after a releasable dog has been moved to an unlocked position.

One of the important aims of the invention is to provide a dump trailer of the aforementioned character, which has a pair of supporting wheels movably carrying the trailer structure, and associated with the body thereof in such fashion as to permit the body to pivot about the axis of the wheels when the same are held stationary and when force is imparted to the specially constructed frame of the trailer in one direction so as to move the body to the dumping position, said frame being arranged so that when force is imparted thereto in the opposite direction, the body is held against tipping.

A yet further object of the invention is the provision of a dump trailer that has specially pivotally interconnecting frame and yoke members, the pivotal connection joining said members being between the normal forward end of the body of the trailer and the single axle supporting the body, and above the axis of said axle.

Still further aims of this invention include the provision of strong and durable parts for the dump trailer above mentioned; the provision of a novelly mounted, swingable end gate; the provision of unique locking parts for releasably holding the body in a set position during transportation thereof; and specially related parts which, upon manual manipulation, will simultaneously move the latch for the gate and the locking dog for the body to the released position.

Heretofore dump trailers have usually required special power-driven means for tilting the body to the dumping position. Such structure involves expense and loss of time in operation. The present invention obviates the necessity for power-driven mechanism to dump the body of the trailer and utilizes specially constructed and interrelated parts that cause the trailer body to be carried to the dumping position merely upon securing the supporting wheels thereof against rotation and then "backing" the truck or tractor.

Minor objects of the invention will become obvious to those skilled in the art upon reference to the following specification, alluding to the accompanying drawing, wherein.

Figure 1:
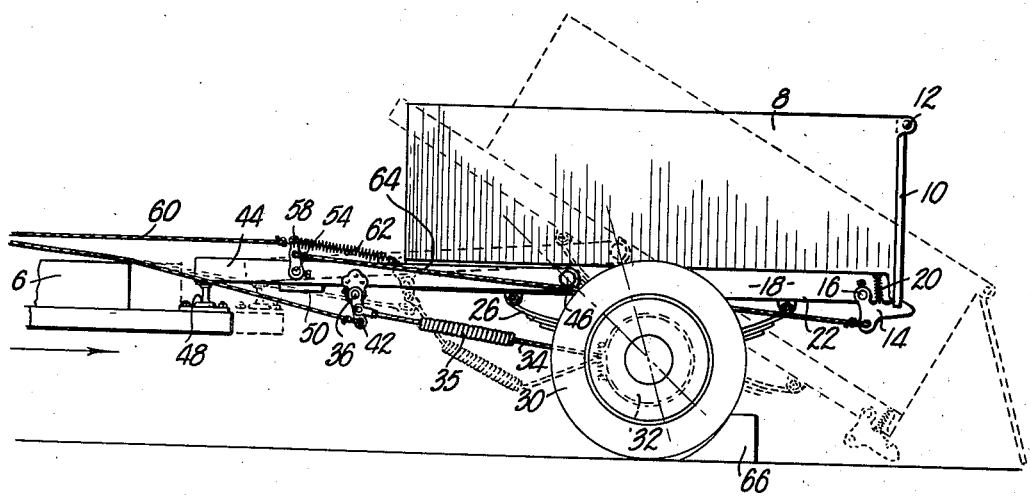
Figure 1 is a side elevation of a dump trailer made to embody the present invention.

In the preferred embodiment of the dump trailer, exemplified in the accompanying illustrations, a truck or tractor 6, of any conventional and well known design is employed for the purpose of drawing the trailer. The trailer per se comprises a body 8 of suitable size and proportions, that is equipped with an end gate 10, hingedly mounted about hinge pins 12 and held in the closed positions by a pair of latches 14. These latches are secured to a transverse shaft 16, that is journalled for rotation in frame 18. A spring 20 yieldably maintains latches 14 in the position illustrated in solid lines of Figs. 1 and 2 and where gate 10 is secured in place.

Body 8 is mounted upon a frame 22 which underlies body 8 and extends forwardly to form a V-shaped projection 24. Frame 22 carries a pair of conventional leaf springs 26 that depend below frame 22 and join axle 28 that extends transversely across body 8, from side to side thereof in a plane substantially mid-way between the ends of body 8. This axle 28 carries a pair of wheels 30, equipped with conventional brake structure 32, which includes the forwardly extending cables 34 that are joined to transverse shaft 36 through the medium of clevises 38. Upon rotation of this shaft 36, the brake structure is set or released, as the case may be. A cable 40, attached at one end to lever 42, is extended forwardly within reach of the driver of the tractor 6.

A spring 35, interposed between the two stretches of cable 34, compensates for the change in distance between the axis of axle 28 tnd the axis of shaft 36 during operation of the dumping structure through the use of brakes 32. In this connection it is obvious that the said distance shortens when body 8 is tilted. The spring 35 is closed in normal condition. When the brakes are set, the spring is stretched to exert necessary pull and as the distance between axle 28 and shaft 36 is shortened due to backing and tilting, spring 35 approaches its normal condition but all the while holds the brakes set until the operator releases them. Any other suitable means may be employed to attain the same end, but the parts disclosed embodying a working embodiment of that feature of the invention. Also, any other suitable brake well known in the art may be employed.

Figure 2:
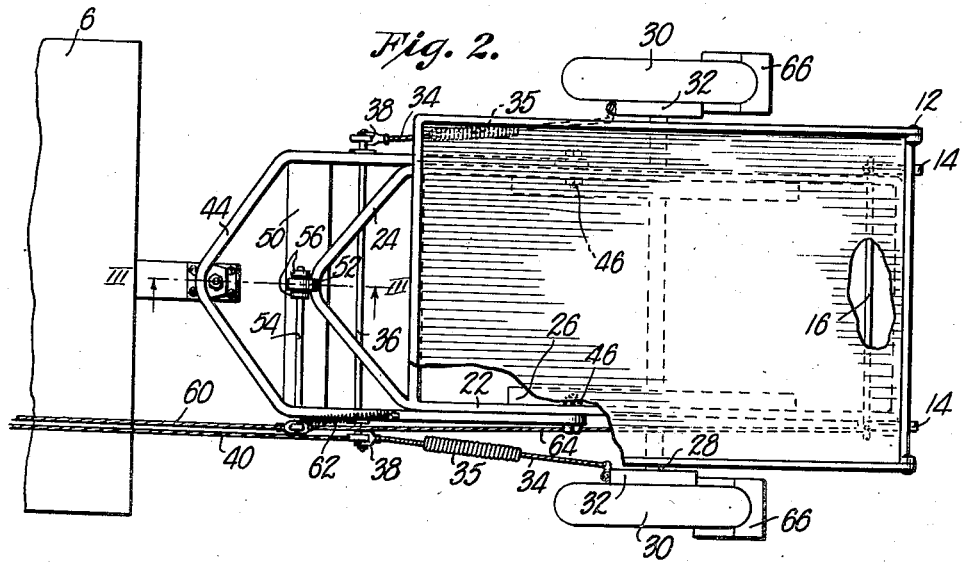
Fig. 2 is a top plan view of the same, with parts broken away for clearness, and, Fig. 3 is an enlarged, fragmentary, detailed, sectional view, taken on line III—III of Fig. 2.

A U-shaped yoke 44 embraces frame 24 so that the legs of yoke 44 extend along the sides of frame 22, as indicated by Figs. 1 and 2. Pintles 46, pivotally join together the proximal sides of frame 22 and legs of yoke 44. A coupling structure 48 serves to join together a part of tractor 6 and yoke 44 and the part of structure 48 that is carried by yoke 44 is located at the bight thereof on the longitudinal center line of the trailer assembly. The point formed by the V-shaped projection 24 of frame 22 is between the bight of yoke 44 and the forward end of body 8 when the trailer is in the normal position.

Figure 3:
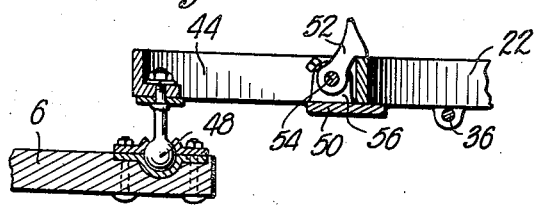

A sill 50, extending across from leg to leg of yoke 44, supports dog 52 that should be on the longitudinal center line aforementioned. This dog is mounted upon a shaft 54, journalled in bearings 56, as well as in one leg of yoke 44. A laterally extended arm 58, secured to shaft 54 near the outer end thereof, has a cable 60 fastened to one end so that shaft 54 may be rotated by manipulating cable 60 from the driver's seat, not shown. Spring 62 yieldably maintains dog 52 in the position shown in Figs. 2 and 3. Another cable 64 interconnects arm 58 and latch 14 so that when cable 60 is pulled to stretch spring 62, both shafts 54 and 16 respectively will be rotated to simultaneously release dog 52 and both latches 14.

In the operation of the dump trailer, and assuming that body 8 is filled with material to be dumped, it is only necessary for wheels 30 to be secured against rotation so that a "backing" of truck 6 will effect the dumping operation. Wheels 30 may be run against block 66 or brakes 32 may be set, whereupon cable 60 will be pulled to release dog 52 and latches 14. After this is done, the truck is backed so as to move in the direction of the arrow shown in Fig. 1, and the result is a tipping of body 8 to the position shown in dotted lines.

It is conceivable by one skilled in the art that the power imparting truck, tractor or the like might be rigidly incorporated with the dump trailer as a unit and the forward part of the frame 44 made as an integral part of any power plant having traction wheels capable of transporting the body 8. In such instance, the pivotally interconnected frame and yoke would become a jointed chassis.

Manifestly, the relative location of pintles 46 with respect to the axis of axle 28, about which body 8 may swing when the wheels are "set" is an important factor and permits both a tipping movement when truck 6 is "backed" and assists in precluding a tipping movement when truck 6 is drawing the loaded trailer.

Dump trailers having different forms and appearances than the one illustrated and described may be made without departing from the spirit of the invention or scope of the appended claims.

Having thus described the invention, what is claimed as new and desired to be secured by Letters Patent is:

1. A dump trailer of the character described comprising a body; a frame underlying the body and extending forwardly beyond one end thereof and formed to present a V-shaped projection; an axle and spring assembly supporting the frame and body, said axle extending transversely across the body therebelow substantially mid-way between the ends of the body; a U-shaped yoke provided with a coupling at the bight thereof and having the ends of the legs thereof pivotally joined to the said frame on an axis between the said end of the body and the axis of the wheels and above said axis; and a dog releasably securing together the V-shaped projection and said frame.

2. A dump trailer of the character described comprising a body; a frame underlying the body and extending forwardly beyond one end thereof and formed to present a V-shaped projection; an axle and spring assembly supporting the frame and body, said axle extending transversely across the body therebelow substantially midway between the ends of the body; a U-shaped yoke provided with a coupling at the bight thereof and having the ends of the legs thereof pivotally joined to the said frame on an axis between the said end of the body and the axis of the wheels and above said axis; and a dog releasably securing together the V-shaped projection and said frame, said U-shaped yoke having a sill extending thereacross from one leg to the other below the V-shaped projection of the frame, said dog being mounted upon the said sill on the longitudinal center line of the body.

3. A dump trailer of the character described comprising a body; wheels supporting the body for tilting movement about an axis intermediate the ends of the body; a frame having a pair of side rails underlying said body and provided with a V-shaped, forwardly extending portion in the same major plane as the underlying side rails; a U-shaped yoke having a bight and a pair of parallel, spaced apart legs; a coupling on the yoke at the bight thereof for securing the same to a tractor; a sill bridging the space between the legs of said yoke between the bight thereof and the forward end of said body; a dog on the sill on the longitudinal center line of the body, for releasably engaging the apex of the V-shaped forwardly extending portion of the frame; and means pivotally joining together the legs of said yoke and the proximal respective side rails of said frame, said side rails and legs of the yoke being in side by side relation throughout a portion of their length, said pivotal connection between the side rails and said legs of the yoke being approximately one third the length of said body to the rear of the forward end of the body, the forward portion of said body being directly supported by the side by side portions of the side rails and legs of the frame and yoke respectively when in the normal position.

RAYMOND C. KASTER.